Jan. 27, 1925.
A. B. ROWLAND
1,524,108
TOW ROPE CONNECTER
Filed Aug. 8, 1921
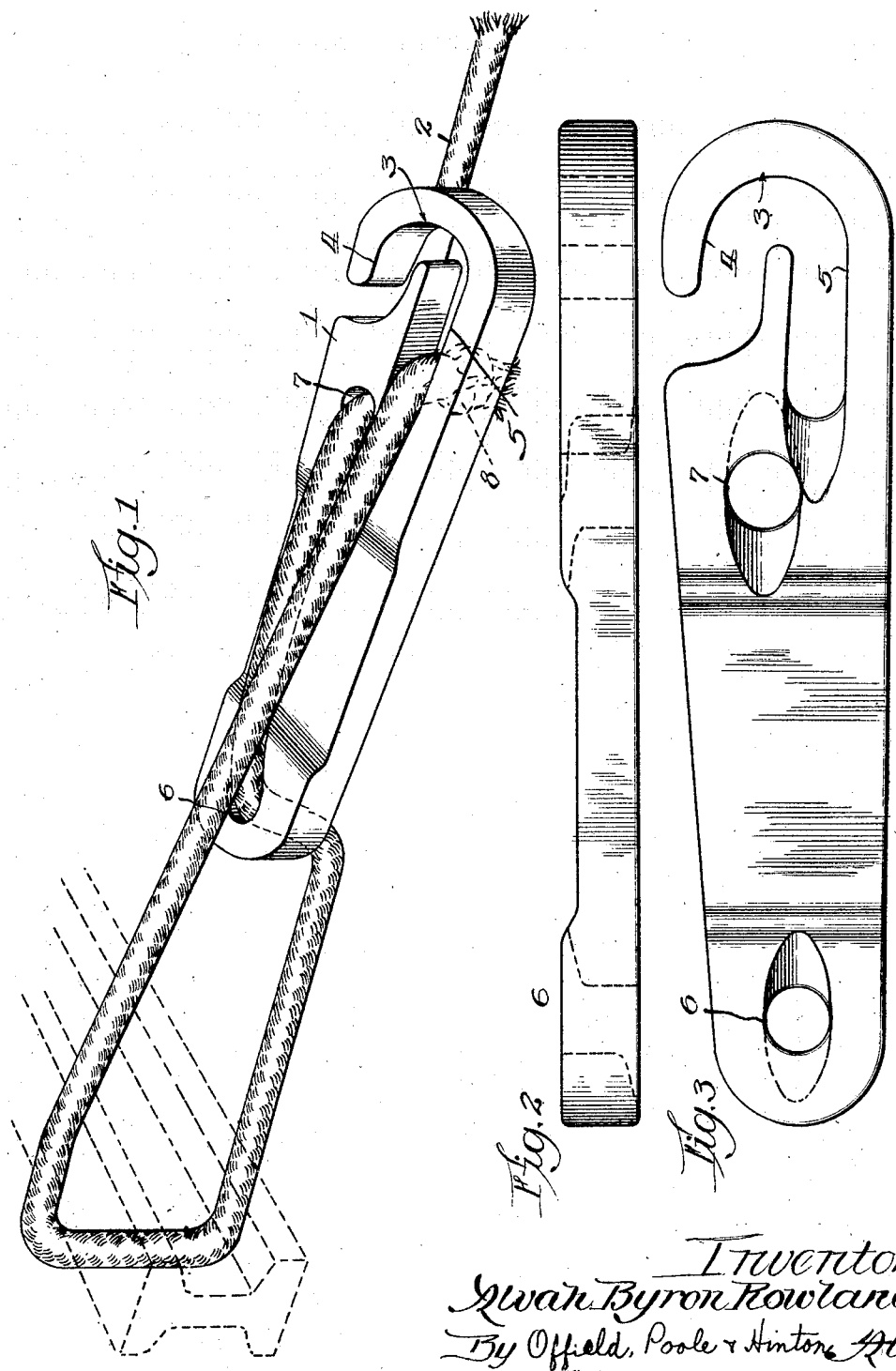
Inventor,
Alvah Byron Rowland,
By Offield, Poole & Hinton Attys Patented Jan. 27, 1925.

1,524,108

UNITED STATES PATENT OFFICE.

ALVAH BYRON ROWLAND, OF XENIA, OHIO, ASSIGNOR TO THE HOOVEN & ALLISON COMPANY, OF XENIA, OHIO, A CORPORATION OF OHIO.

TOW-ROPE CONNECTER.

Application filed August 8, 1921. Serial No. 490,444.

*To all whom it may concern:*

Be it known that I, ALVAH BYRON ROWLAND, a citizen of the United States, and a resident of Xenia, in the county of Greene and State of Ohio, have invented certain new and useful Improvements in Tow-Rope Connecters, of which the following is a specification.

This invention relates to tow rope connecters, such as may be used for automobiles or the like. The principal object of the invention is to produce a tow rope and connecter, capable of being quickly attached and detached from an automobile, one capable of being readily adjusted in length, and one in which the attachment is quickly releasable no matter how much strain there has been imposed upon it.

In the drawings which represent one form in which my invention may be embodied,—

Fig. 1 is a perspectice view of the tow rope as attached to an automobile axle, and Fig. 2 is a side view of the cleat forming a part of the same, and Fig. 3 is a plan view of the cleat.

As shown in the drawings, a cleat or toggle 1 is provided adjacent one end of the tow rope 2. Said cleat is provided with a slot 3, formed near one end thereof, and opening to one side of the cleat. Said slot is preferably curved so as to have one portion 4, thereof turned first toward the adjacent end of the cleat, and a second portion 5 extending in the opposite direction along the closed side of the cleat.

An aperture 6 is formed in the end of the cleat opposite the slot 3, and a second aperture 7 is spaced longitudinally from the aperture 6, said apertures being arranged in a line which crosses said slot near its open end.

An intermediate portion of the rope 2 is threaded through apertures 6 and 7, and the rope is provided with a suitable stop, such as knot 8, at a point beyond the aperture 6. Under ordinary circumstances, said knot is formed at the free end of the rope, as shown, although it will be understood that it may be made at any other point, as desired.

The use and operation of my device is as follows.

When it is desired to attach the rope to an automobile axle, or similar part to be secured, the free end of the rope is passed about the axle and thence to the cleat to form a loop. The knotted end is then inserted in the slot 3, as shown in Fig. 1, and moved into the portion 5 thereof, with the knot 8 engaged against the cleat. Upon application of tension on the rope, that portion extending through aperture 7 will extend across the slot 3, thereby effectively holding the knotted end from accidental displacement therefrom, until the tension is released. The loop may also be formed in the direction reversed from that illustrated, that is to say with the knot 8 extending upwardly from the slot 3 instead of downwardly, but in either case the knotted end is retained in place by an intermediate portion of the rope, as already described. As soon as tension is released, the knotted end may be readily removed from the slot to free the rope from the part secured. Furthermore, while the device is not under tension, the cleat may be placed at any desired position along the rope, so as to form a loop of varying lengths, without causing the cleat to slip during application of tension thereon. The position of the retaining knot 8 may also be changed, if desired, to vary the length of the rope.

Among other advantages of my device, it will be noted that it is simple in construction and operation, will not injure the rope, and requires no splicing to attach the cleat to the rope.

Having described my invention, I claim:

1. In a tow rope, a substantially flat connecter provided with a transversely disposed slot opened at one end thereof, a rope portion having a knotted free end engaged in said slot, and a second rope portion extending from said connecter at a point adjacent to the mouth of the slot, whereby tension on the rope longitudinally of the connecter maintains said second rope portion across said slot to retain said first rope portion therein.

2. In a tow rope, a connecter provided with a transversely disposed slot opened at one end thereof, and a rope comprising a single length, having a knotted end adapted to engage in said slot, and means connecting an intermediate portion of said rope at two points on said connecter, whereby tension on the rope maintains said intermediate portion across said slot and retains said free end therein.

3. In a tow rope, a connecter provided with a transversely disposed slot opened at one end thereof, and having two longitudinally spaced apertures, and a rope comprising a single length having an intermediate portion threaded through said apertures and a free end provided with a stop adapted to engage in said slot to form a loop.

4. In combination with a tow rope, a connecter provided near one end with a curved slot opening to one side and extending first toward the adjacent end and thence toward the opposite end of the connecter, said connecter also having two longitudinally spaced apertures both beyond said slot but arranged in a line crossing the same.

In witness whereof, I hereunto subscribe my name this 30 day of July, A. D. 1921.

ALVAH BYRON ROWLAND.